March 3, 1970  S. L. CHAMPION  3,498,176
METHOD FOR CASTING A PARTIAL IMPULSE ROCKET MOTOR
Filed April 25, 1968  3 Sheets-Sheet 1
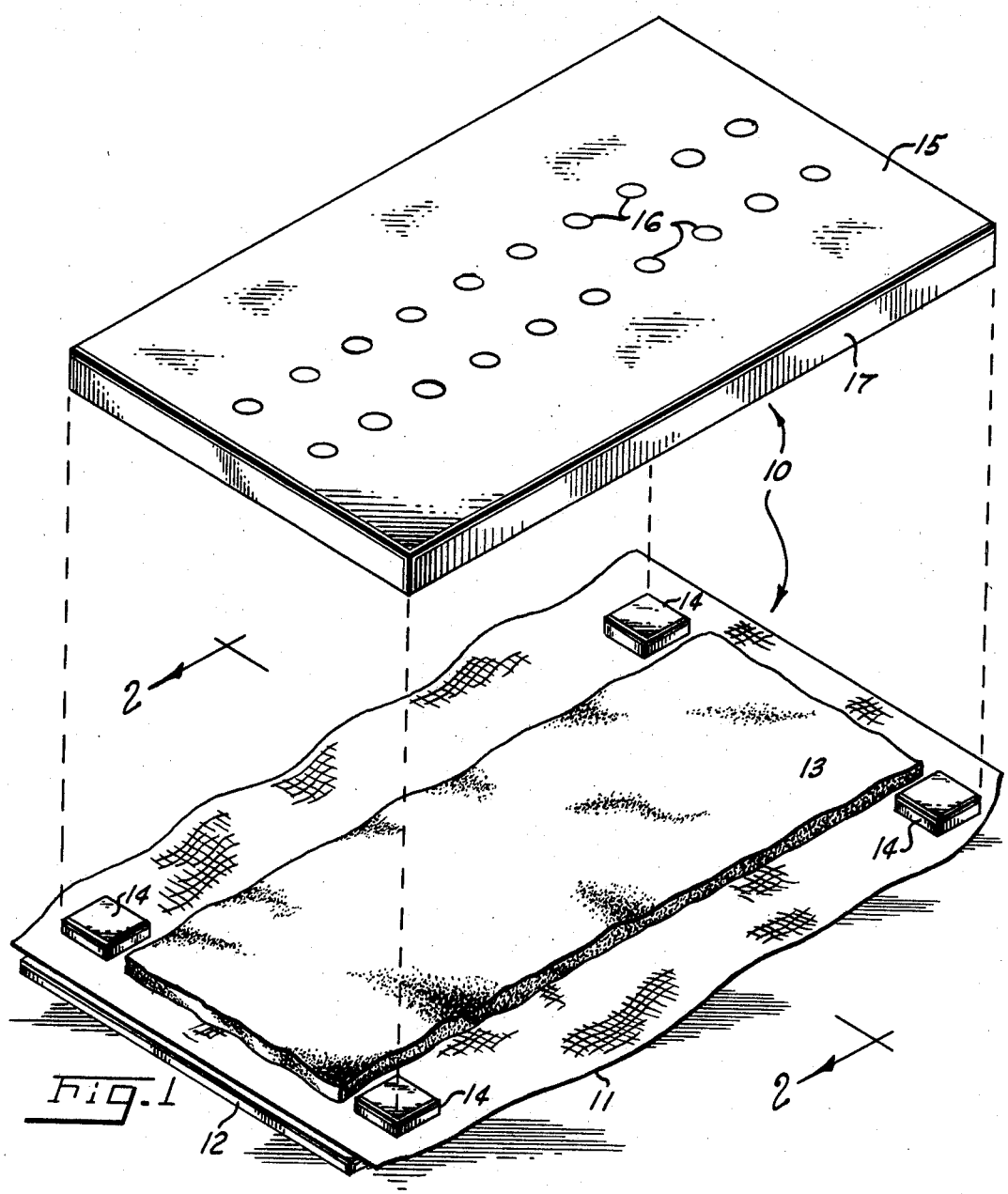
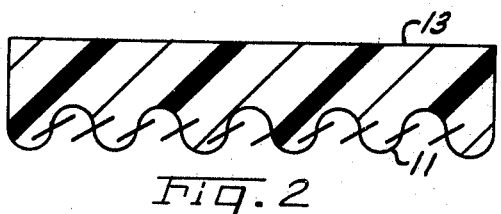
Samuel L. Champion INVENTOR.
BY
ATTORNEY March 3, 1970     S. L. CHAMPION     3,498,176
METHOD FOR CASTING A PARTIAL IMPULSE ROCKET MOTOR
Filed April 25, 1968     3 Sheets-Sheet 2

Samuel L. Champion INVENTOR.

BY

ATTORNEY

March 3, 1970  S. L. CHAMPION  3,498,176
METHOD FOR CASTING A PARTIAL IMPULSE ROCKET MOTOR
Filed April 25, 1968  3 Sheets-Sheet 3

Samuel L. Champion INVENTOR.

BY

ATTORNEY 3,498,176
METHOD FOR CASTING A PARTIAL IMPULSE
ROCKET MOTOR
Samuel L. Champion, Huntsville, Ala., assignor to Thiokol Chemical Corporation, Bristol, Pa., a corporation of Delaware
Filed Apr. 25, 1968, Ser. No. 724,045
Int. Cl. F42b 15/10; F02k 9/06
U.S. Cl. 86—1                  5 Claims

ABSTRACT OF THE DISCLOSURE

The method which includes the placing of a sheet of inert pliable backing material in a propellant mold, applying a layer of a propellant grain onto the backing, curing the propellant grain, removing the propellant grain from the mold, applying the propellant grain to a core or mandrel, positioning the core or mandrel in a rocket motor case, casting an inert material into the rocket motor case and then pressure curing the propellant grain in the rocket motor case.

BACKGROUND OF THE INVENTION

Field of the invention

A requirement arose to produce a solid propellant rocket motor that would have as one of its characteristics a reduced impulse when in operational flight. The configuration of the rocket motor case for the solid propellant rocket motor would not be changed, but the impulse achieved by filling the rocket motor case with a full load of a solid propellant grain would have to be reduced. It was deemed advisable that to achieve the desired result, the best approach was to place in the rocket motor case a less amount of a solid propellant grain and replace the solid propellant grain thus eliminated with an inert material.

The instant invention was therefore developed and included a method whereby a limited predetermined amount of the solid propellant grain was placed in the rocket motor case to achieve the desired reduced impulse that was needed to achieve the necessary operational requirements.

Description of the prior art

In the past several cores or mandrels, had been utilized to place several layers of propellant grain in a rocket motor case, but such procedure was expensive and the manufacture of the cores and mandrels, as to shape, size etc. was a very critical item.

The spacing between the cores or mandrels in which the solid propellant grain was to be placed was critical and if the spacing was determined to be too large or too small, new cores or mandrels had to be manufactured.

The present invention, however, depends only on the thickness of the layer of solid propellant grain that is placed in the propellant mold and if a less or greater thickness is desired to achieve desired results, the only change required is to use a smaller or larger amount of the solid propellant grain, thus no undue expense is created in producing a solid propellant rocket motor having the desired impulse.

SUMMARY OF THE INVENTION

This invention relates, therefore, to a method for casting a partial impulse solid propellant rocket motor and more particularly to a method for determining the precise amount of the solid propellant that is to be cast into the solid propellant rocket motor to achieve the desired impulse that is required during the operation or flight of the solid propellant rocket motor.

Attempts had previously been made to cast a thin layer of a solid propellant grain into a core or mandrel, but because of the viscosity of the solid propellant grain and the extremely high pressure drop during the casting of the solid propellant grain, the flow of the solid propellant grain could not be properly controlled and such a procedure was discontinued.

One of the main requirements for a solid propellant rocket motor having a reduced impulse was for testing the launching mechanism for the solid propellant rocket motor wherein such testing did not require a full operational flight of the solid propellant rocket motor, but only a short flight within the required range, to properly test the launching mechanism. It was, therefore not desired to change the configuration of the solid propellant rocket motor or alter it in any manner. Thus the requirement for a smaller amount of solid propellant grain in the rocket motor case was the primary factor for developing the method covered by the instant invention.

An object of this invention is, therefore, to develop a method whereby a solid propellant rocket motor having, a reduced impulse, could be inexpensively and rapidly produced for test purposes.

Another object of the invention is to provide a method whereby a solid propellant grain, meeting reduced impulse requirements can be cast into a rocket motor case.

While only certain objects and advantages have been set forth, it is believed that other objects and advantages will become apparent to one skilled in the art from the following detailed description when taken in conjunction with the accompanying drawings in which:

BRIEF DESCRIPTION OF THE DRAWINGS

FIGURE 1 is an exploded perspective view of a two part propellant mold showing the manner in which the backing strip and layer of a solid propellant grain is positioned on the lower part of the propellant mold to carry out the method embodied in the instant invention;

FIGURE 2 is a cross sectional view of the backing strip and layer of a solid propellant grain as taken on line 2—2 of FIGURE 1;

DESCRIPTION OF THE PREFERRED EMOBDIMENT

Figure 3:
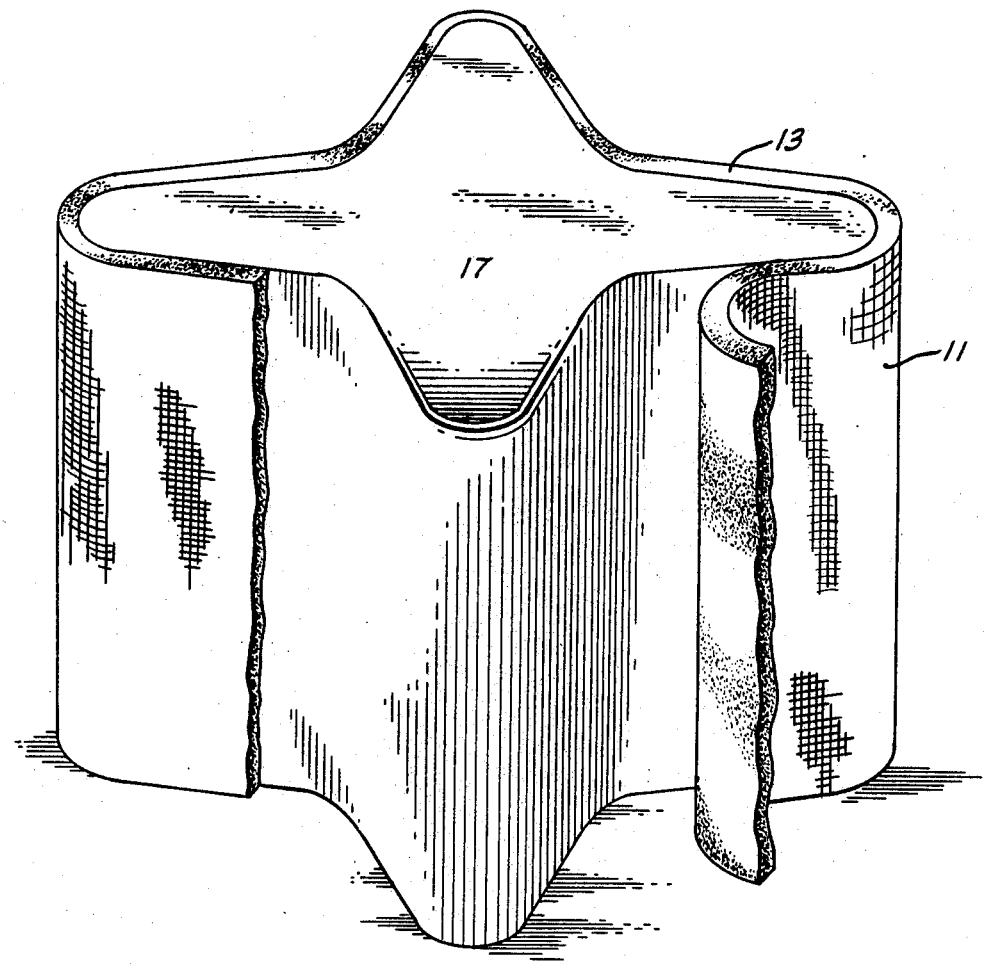
FIGURE 3 is a perspective view of a core or mandrel and showing the application of the backing strip with the layer of solid propellant grain bonded thereto, onto the core or mandrel.
Figure 4:
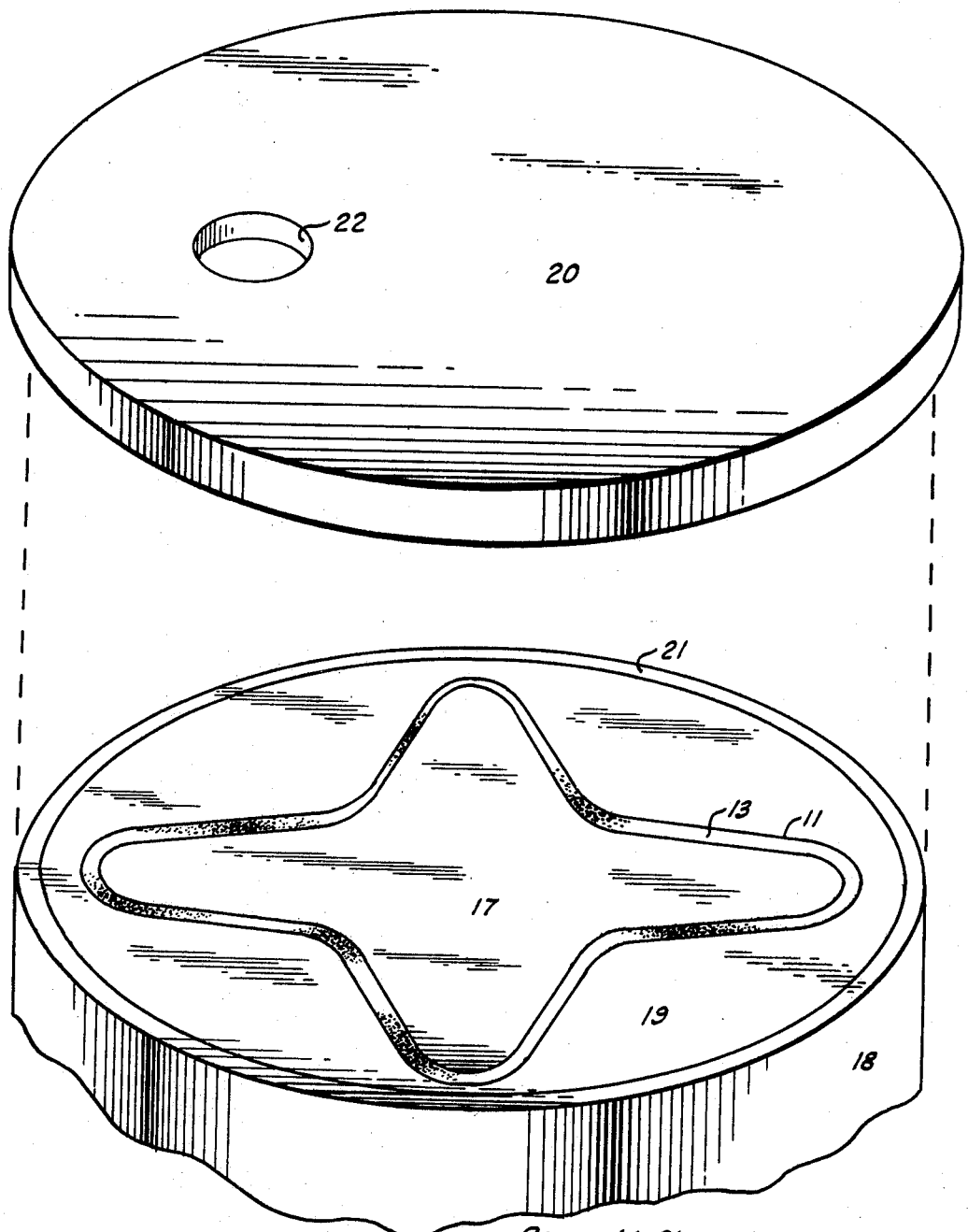
FIGURE 4 is a perspective view, partly broken away, of a rocket motor case, the pressure cover plate to be applied thereto and showing the core or mandrel as shown in FIGURE 3 in place and the inert material cast into the rocket motor case prior to the final pressure curing of the solid propellant grain that is applied to the core or mandrel.

Referring more in detail to the drawings wherein like parts are designated by like reference numerals, the reference numeral 10 is used to generally designate a two part propellant mold that is utilized to carry out the method embodying the invention.

In carrying out the method embodying the invention, a pliable inert backing material 11 that may be canvas or any other similar material, is laid on a lower part 12 of the two part propellant mold 10. Then a layer of a solid propellant grain 13 is applied to the upper surface of the backing material 11 by hand trowelling or in some similar manner and then a spacing block 14 is placed on the upper surface of the backing material 11 approximately adjacent each corner of the lower part 12 of the propellant mold 10.

An upper part 15 of the two part propellant mold 10 is manually positioned, if for a small solid propellant rocket motor or by some conventional handling or hoisting device, if for a large solid propellant rocket motor on the upper surface of the layer of solid propellant grain 13. Pressure is then applied to the upper surface of the upper part 15 until it rests evenly on the upper surfaces of the spacing blocks 14. A pair of longitudinally extending, relatively spaced rows of equally spaced openings 16 are provided in the upper part 15 medially thereof and any excess of the solid propellant grain 13 that does not flow beyond the perimeter of the lower and upper parts 12 and 15 of the mold 10 can flow upwardly through the openings 16 in the upper part 15.

It is to be understood that the thickness of the spacing blocks 14 determine the final thickness of the layer 13 of the solid propellant grain as it will be later used in carrying out the method embodying the instant invention.

The upper part 15 of the propellant mold 10 can be manufactured either with a depending right angularly extending peripheral rim 19 which will trim the backing sheet 11 and the layer of solid propellant grain 13 to conform to the overall size of the lower part 12 of the propellant mold 10 or the upper part 15 can be a flat member and the backing 11 and layer of solid propellant grain 13 can be trimmed by hand after clamping members, not shown, have been applied to the upper and lower surfaces of the lower and upper parts 12 and 15 of the propellant mold 10 to retain the lower and upper parts 12 and 15 in fixed relation to each other. The entire assembly is then placed in an oven to partially cure the layer of solid propellant grain 13. At this time the layer of solid propellant grain 13 is still pliable, but will not flow so that there is any deformation of the layer of solid propellant grain 13 as to its thickness, length or width.

At the completion of the partial cure of the layer of solid propellant grain 13, the entire assembly is removed from the oven, the clamping members are removed from the propellant mold 10 and the layer of solid propellant grain 13, which has now become bonded to the backing sheet 11, is then applied by hand to the core or mandrel 17, as shown in FIGURE 3, after a suitable bonding material has been applied to the outer surface of the core or mandrel 17, to which the layer of solid propellant grain 13 with the backing sheet 11 on the exterior surface thereof, will be bonded.

The core or mandrel 17, with the layer of solid propellant grain 13 bonded thereto, will then, by suitable hoisting means, be lowered into a rocket motor case 18 for a solid propellant rocket motor. The core or mandrel 17 will then be centered in the rocket motor case and an inert material 19, such as any well-known foam material, will be cast by conventional methods into the rocket motor case 18 to entirely fill the space that now exists between the exterior surface of the backing sheet 11 and the interior of the rocket motor case 18.

The inert material 19 will apply sufficient pressure to the layer of solid propellant grain 13 and the backing sheet 11 bonded thereto to cause the layer of solid propellant grain 13 and the backing sheet 11 to more closely conform to the configuration of the core or mandrel 17.

A pressure cover plate 20 is then connected to the open end 21 of the rocket motor case 18 and pressure is introduced into the rocket motor case 18 by means of the opening 22 in the cover plate 20 and the layer of solid propellant 13 is then cured to the desired viscosity. When the layer of solid propellant 13 has been properly cured, the cover plate 20 is removed and the final finishing and assembly of the solid propellant rocket motor is performed by any well-known normal methods of manufacture.

The method previously described describes the preparation mold and curing of a live segment of solid propellant, the assembly of this live segment to the core or mandrel and the position of the core or mandrel with the live segment bonded thereto in a rocket motor case and the casting of the inert material into the rocket motor case and the final curing of the live segment in the rocket motor case and it is believed that the foregoing method and the elements used to carry out such method will be clear to one skilled in the art.

Having thus described the invention what is claimed as new and desired to be secured by Letters Patent is:

1. A method for casting a partial impulse solid propellant rocket motor which includes the steps of placing a pliable backing sheet on the lower part of a two part propellant mold, casting a layer of a solid propellant grain on the upper surface of the backing sheet, placing the upper part of the mold on the layer of solid propellant grain, applying pressure to the upper surface of the upper part of the mold to compress the layer of solid propellant grain to a predetermined thickness, placing the mold, backing sheet and the layer of solid propellant grain in an oven and partially curing the layer of solid propellant grain, removing the mold from the oven and the backing sheet and the layer of solid propellant grain from the mold and bonding the layer of solid propellant grain to a core, placing the core with the layer of solid propellant grain thereon in a rocket motor case, casting an inert material into the rocket motor case to fill the space between the backing sheet on the layer of solid propellant grain and the interior of the rocket motor case and then pressure curing the layer of solid propellant grain in the rocket motor case.

2. The method as in claim 1, wherein the backing sheet and layer of solid propellant grain are hand trimmed to conform to the outer edges of the mold.

3. The method as in claim 1, wherein spacing blocks are placed on the lower part of the mold at all four corners of the lower part of the mold to limit the downward movement of the upper part of the mold and thus regulate the thickness of the layer of the solid propellant grain.

4. The method as in claim 1, wherein a pressure cover plate is placed on the open end of the rocket motor case to confine the pressure in the rocket motor case during the curing of the layer of the solid propellant grain.

5. The method as in claim 1, wherein the layer of solid propellant grain is hand trowelled on the backing sheet.

References Cited
UNITED STATES PATENTS

| | | | |
|---|---|---|---|
| 2,877,504 | 3/1959 | Fox | 86—1 X |
| 3,067,686 | 12/1962 | Coover et al. | 86—1 X |

BENJAMIN A. BORCHELT, Primary Examiner

S. C. BENTLEY, Assistant Examiner

U.S. Cl. X.R.

60—253